(12) United States Patent
Fly et al.

(10) Patent No.: US 9,076,998 B2
(45) Date of Patent: Jul. 7, 2015

(54) FUEL-CELL MEMBRANE-SUBGASKET ASSEMBLIES COMPRISING COATED SUBGASKETS, AND FUEL-CELL ASSEMBLIES AND FUEL-CELL STACKS COMPRISING THE FUEL-CELL MEMBRANE SUBGASKET ASSEMBLIES

(75) Inventors: Gerald W. Fly, Geneseo, NY (US);
Sumeet Bhargava, Rochester, NY (US);
James Leistra, Penfield, NY (US);
Gayatri Vyas Dadheech, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 165 days.

(21) Appl. No.: 13/611,031

(22) Filed: Sep. 12, 2012

(65) Prior Publication Data

US 2014/0072899 A1 Mar. 13, 2014

(51) Int. Cl.
*H01M 8/10* (2006.01)
*H01M 8/02* (2006.01)

(52) U.S. Cl.
CPC ............ *H01M 8/0284* (2013.01); *Y02E 60/521* (2013.01); *H01M 8/1004* (2013.01); *H01M 8/0282* (2013.01); *H01M 8/0273* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 7,569,299 B2 | 8/2009 | Thompson et al. | |
| 7,935,453 B2 | 5/2011 | Beutel et al. | |
| 7,955,750 B2 | 6/2011 | Leistra et al. | |
| 2003/0203267 A1* | 10/2003 | Chou et al. | 429/35 |
| 2007/0059580 A1 | 3/2007 | Budinski et al. | |
| 2008/0105354 A1 | 5/2008 | James et al. | |
| 2009/0181275 A1* | 7/2009 | Beutel et al. | 429/30 |
| 2010/0159294 A1 | 6/2010 | Fly et al. | |
| 2011/0171562 A1 | 7/2011 | Budinski et al. | |
| 2011/0195332 A1 | 8/2011 | Goebel | |
| 2011/0254198 A1 | 10/2011 | Abd Elhamid et al. | |

FOREIGN PATENT DOCUMENTS

JP 2006049195 A * 2/2006

* cited by examiner

*Primary Examiner* — Patrick Ryan
*Assistant Examiner* — Haixia Zhang
(74) *Attorney, Agent, or Firm* — Dinsmore & Shohl LLP

(57) ABSTRACT

Fuel-cell membrane-subgasket assemblies may include an electrolyte membrane and a coated subgasket overlying the electrolyte membrane around a perimeter of the electrolyte membrane so as to define an active area inside the perimeter. The coated subgasket may comprise a subgasket body formed from a subgasket material. At least one side of the coated subgasket includes a subgasket coating layer containing or formed from a coating material such as metals, ceramics, polymers, polymer composites, or other hard coatings. Fuel-cell assemblies may include gas diffusion media, a bipolar plate, and a fuel-cell membrane-subgasket assembly having a coated subgasket. Fuel-cell stacks may include clamping plates, unipolar endplates, and a plurality of individual fuel-cell assemblies, at least one of which includes a fuel-cell membrane-subgasket assembly having a coated subgasket.

10 Claims, 5 Drawing Sheets

FUEL-CELL MEMBRANE-SUBGASKET ASSEMBLIES COMPRISING COATED SUBGASKETS, AND FUEL-CELL ASSEMBLIES AND FUEL-CELL STACKS COMPRISING THE FUEL-CELL MEMBRANE SUBGASKET ASSEMBLIES

TECHNICAL FIELD

The present specification generally relates to fuel-cell systems and, more particularly, to fuel-cell membrane-subgasket assemblies having metalized or hard-coated subgaskets, to fuel-cell assemblies comprising the fuel-cell membrane-subgasket assemblies, and to fuel-cell stacks comprising the fuel-cell assemblies.

BACKGROUND

Fuel cells have been proposed as a clean, efficient, and environmentally responsible power source for electric vehicles and various other applications. In particular, fuel cells have been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically positioned between porous diffusion media (DM), such as carbon fiber paper, which facilitate delivery of reactants such as hydrogen to the anode and oxygen, typically from air, to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. A typical ionomer is a perfluorosulfonic acid (PFSA) polymer, such as Nafion®, commercially available from the E.I. du Pont de Nemours and Company. The electrodes of the fuel cell are generally formed from a finely divided catalyst. The catalyst may be any electro-catalyst that catalytically supports at least one of an oxidation of hydrogen and a reduction of oxygen for the fuel cell electrochemical reaction. The catalyst may be a precious metal such as platinum or another platinum-group metal. The catalyst is generally disposed on a carbon support, such as carbon black particles, and is dispersed in an ionomer. The electrolyte membrane, electrodes, and DM are positioned between a pair of fuel cell plates and sealed, for example, with a gasket providing a substantially fluid-tight seal.

The electrolyte membrane also typically has a barrier film or subgasket coupled thereto to provide internal reinforcement and to separate the hydrogen gas and the air supplied to the fuel cell stack. The subgasket generally overlays an edge of the electrolyte membrane and is formed in a secondary operation by cutting a piece of polymeric sheet material and bonding the sheet material to the electrolyte membrane with at least one of compression and an adhesive. Some examples of subgaskets and means for coupling subgaskets to the electrolyte membrane are described in commonly-owned U.S. Pat. No. 7,935,453, the entirety of which is hereby incorporated herein by reference.

A subgasket that follows a periphery of the fuel cell plate active area abuts the MEA and can overlap the MEA. The subgasket generally functions both to support the MEA and to electrically insulate the cathode flow field of a fuel cell from the anode flow field of an adjacent fuel cell in a stacked assembly. The subgasket also electrically insulates the regions outside the flowfield. An inner edge of the subgasket defines the active region of the MEA.

Rigorous conditions such as high temperature and high pressure, both of which are encountered during normal operation of fuel cells, necessitate constructing the various components of the fuel cell from materials that do not degrade or deform. Common causes of degradation or deformation include localized areas of high compression when thick subgaskets are used or areas of subgasket deflection by the flow of reactant gases when thin subgaskets are used. Such degradations or deformations of the subgasket may negatively affect the life of the MEA or may decrease the performance of the fuel cell as a whole.

There remain ongoing needs, therefore, for improved subgaskets that can be incorporated into MEAs, fuel-cell assemblies including the MEAs, and fuel-cell stacks including one or more of the fuel-cell assemblies, with which the problems of subgasket degradation and deformation can be addressed without sacrificing manufacturing costs or production output.

SUMMARY

Against the above background, some embodiments described herein are directed to fuel-cell membrane-subgasket assemblies. The fuel-cell membrane-subgasket assemblies may include an electrolyte membrane and a coated subgasket overlying a perimeter of the electrolyte membrane. The coated subgasket may define an active area inside the perimeter of the electrolyte membrane. The coated subgasket may include a subgasket body formed from a subgasket material. The subgasket body may have a first subgasket side facing the electrolyte membrane and a second subgasket side opposite the first subgasket side. At least one of the first subgasket side of the subgasket body and the second subgasket side of the subgasket body may include a subgasket coating layer over the subgasket material. The subgasket coating layer may contain or be formed from one or more coating material such as metals, steels, alloys, ceramics, oxides, nitrides, carbides, carbon, diamond like carbon, acrylics, polymers, polymer composites, and hard coatings, for example.

Further embodiments described herein are directed to fuel-cell assemblies comprising the fuel-cell membrane-subgasket assemblies according to one or more embodiments also described herein. A fuel-cell assembly may include a first gas diffusion medium, a second gas diffusion medium, a fuel-cell membrane-subgasket assembly interposed between the first gas diffusion medium and the second gas diffusion medium. The fuel-cell membrane-subgasket assembly may include an electrolyte membrane and a coated subgasket overlying a perimeter of the electrolyte membrane. The coated subgasket may define an active area inside the perimeter of the electrolyte membrane. The coated subgasket may include a subgasket body formed from a subgasket material. The subgasket body may have a first subgasket side facing the electrolyte membrane and a second subgasket side opposite the first subgasket side. At least one of the first subgasket side of the subgasket body and the second subgasket side of the subgasket body may include a subgasket coating layer over the subgasket material. The subgasket coating layer may contain or be formed from one or more coating material such as metals, steels, alloys, ceramics, oxides, nitrides, carbides, carbon, diamond like carbon, acrylics, polymers, polymer composites, and hard coatings, for example. A first electrode layer of the fuel-cell assembly may be interposed between the electrolyte membrane of the fuel-cell membrane-subgasket assembly and the first gas diffusion medium. A second electrode layer of the fuel-cell assembly may be interposed between the electrolyte membrane of the fuel-cell membrane-subgasket assembly and the second gas diffusion medium. The fuel-cell assemblies may also include a bipolar plate having a cathode side and an anode side opposite the cathode side. The bipolar plate may be in fluidic communication with the electrolyte membrane.

Still further embodiments described herein are directed to fuel-cell stacks comprising at least one of the fuel-cell assemblies described above. The at least one fuel-cell assembly may include a fuel-cell subgasket electrode assembly according to one or more embodiments described herein. The fuel cell stacks may include a first clamping plate, a second clamping plate, a first unipolar endplate disposed between the first clamping plate and the second clamping plate, and a second unipolar endplate disposed between the first unipolar endplate and the second clamping plate. The fuel cell stacks may further include a plurality of individual fuel cell assemblies between the first unipolar endplate and the second unipolar endplate. At least one of the individual fuel cell assemblies may include a first gas diffusion medium, a second gas diffusion medium, a fuel-cell membrane-subgasket assembly interposed between the first gas diffusion medium and the second gas diffusion medium. The fuel-cell membrane-subgasket assembly in such an individual fuel-cell assembly may include an electrolyte membrane and a coated subgasket overlying a perimeter of the electrolyte membrane. The coated subgasket may define an active area inside the perimeter of the electrolyte membrane. The coated subgasket may include a subgasket body formed from a subgasket material. The subgasket body may have a first subgasket side facing the electrolyte membrane and a second subgasket side opposite the first subgasket side. At least one of the first subgasket side of the subgasket body and the second subgasket side of the subgasket body may include a subgasket coating layer over the subgasket material. The subgasket coating layer may contain or be formed from one or more coating material such as metals, steels, alloys, ceramics, oxides, nitrides, carbides, carbon, diamond like carbon, acrylics, polymers, polymer composites, and hard coatings, for example. A first electrode layer of the individual fuel-cell assembly may be interposed between the electrolyte membrane of the fuel-cell membrane-subgasket assembly and the first gas diffusion medium. A second electrode layer of the individual fuel-cell assembly may be interposed between the electrolyte membrane of the fuel-cell membrane-subgasket assembly and the second gas diffusion medium. The individual fuel-cell assembly may further include a bipolar plate in fluidic communication with the electrolyte membrane and having a cathode side facing one of the first clamping plate and the second clamping plate and an anode side facing the other of the first clamping plate and the second clamping plate. In the fuel-cell stacks, adjacent individual fuel cell assemblies of the plurality of stacked individual fuel cell assemblies may share a common bipolar plate between a first individual fuel cell assembly and a second individual fuel cell assembly. In particular, the cathode side of the common bipolar plate may face the first individual fuel cell assembly, and the anode side of the common bipolar plate may face the second individual fuel cell assembly.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
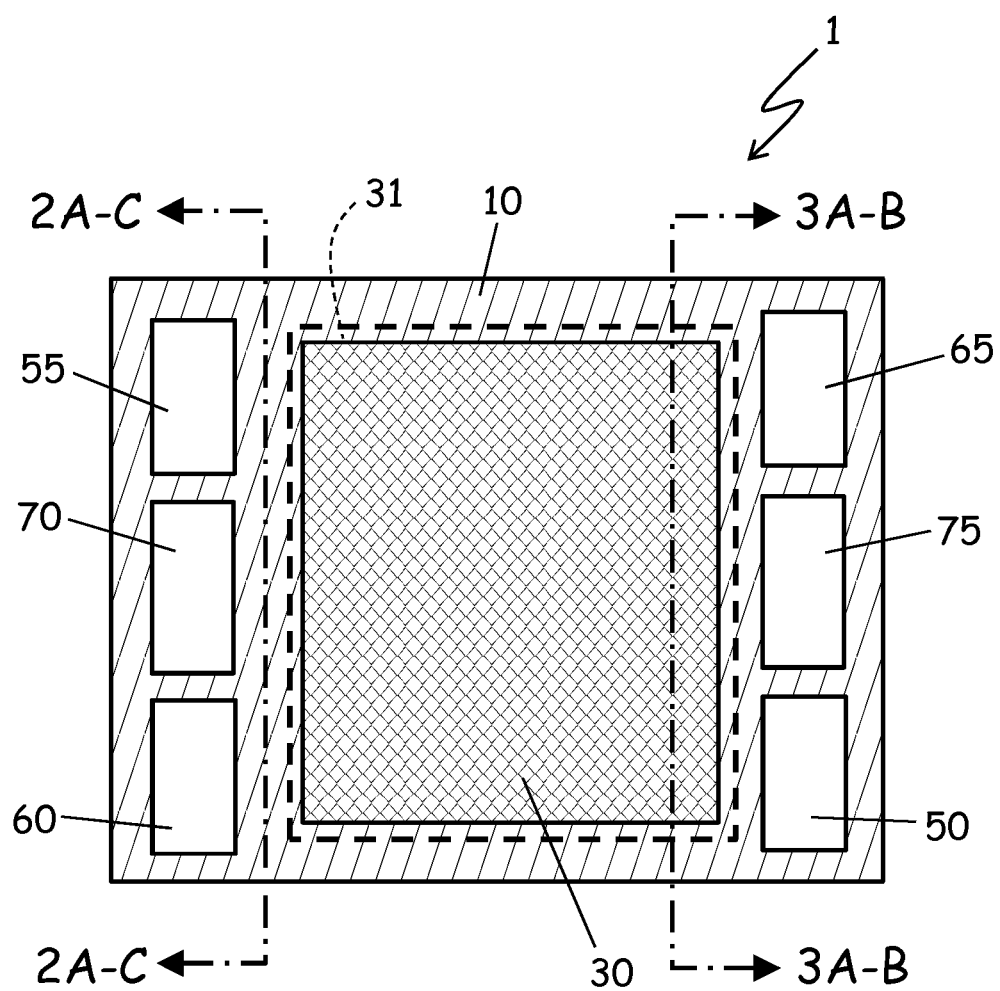
FIG. 1 is a plan view of a fuel-cell membrane-subgasket assembly according to embodiments described herein, including a coated subgasket.
Figure 2A:
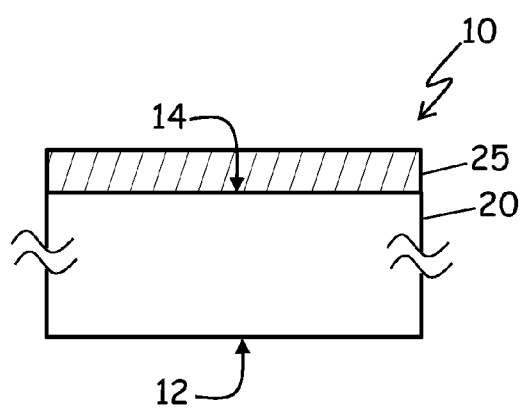
FIG. 2A is a cross-section of the fuel-cell membrane-subgasket assembly of FIG. 1, showing a coated subgasket according to one embodiment disclosed herein, where the coated subgasket is coated on only a first face.
Figure 2B:
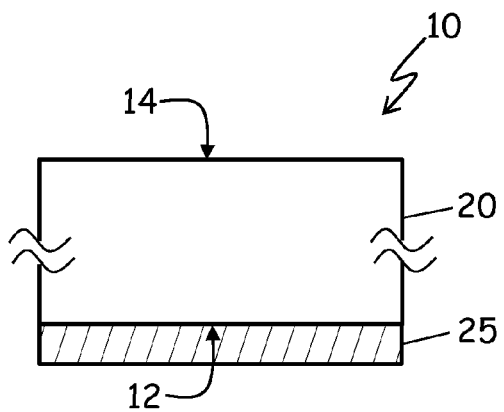
FIG. 2B is a cross-section of the fuel-cell membrane-subgasket assembly of FIG. 1, showing a coated subgasket according to one embodiment disclosed herein, where the coated subgasket is coated on only a second face opposite the first one face.
Figure 3A:
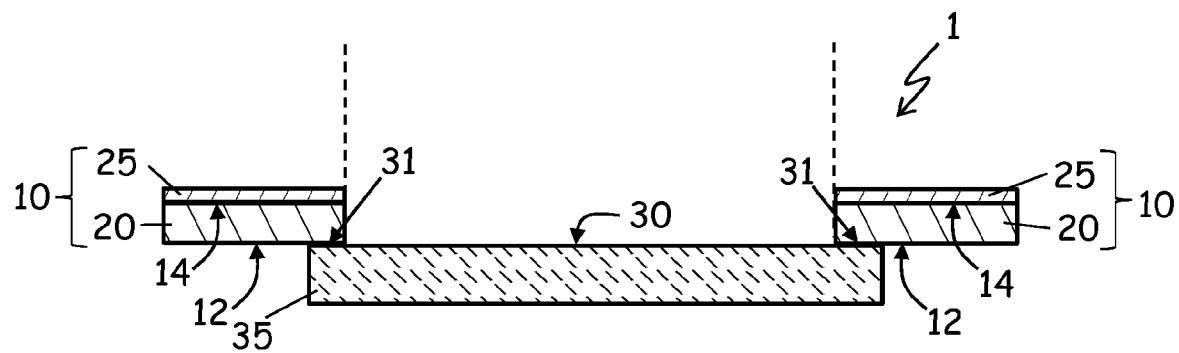
FIG. 3A is a cross-section of one embodiment of a fuel-cell membrane-subgasket assembly, including the subgasket according to the embodiment of FIG. 2A around an outer perimeter of an electrolyte membrane.
Figure 3B:
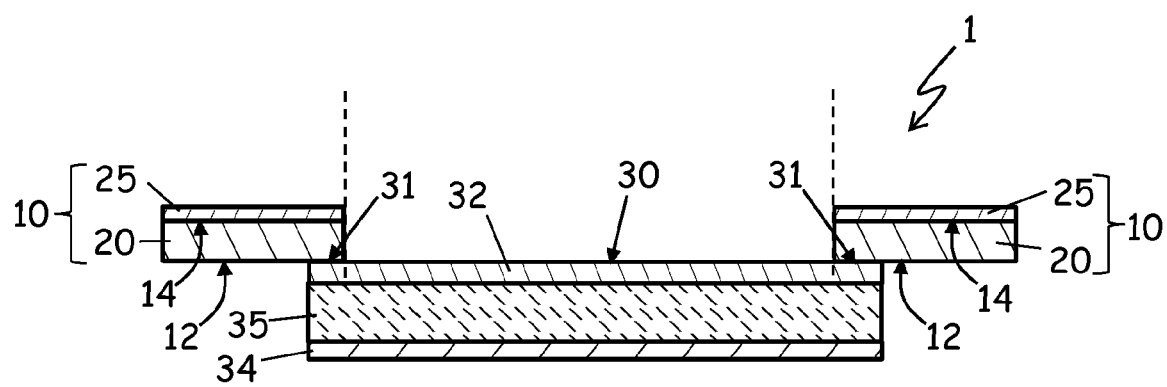
FIG. 3B is a cross-section of one embodiment of a fuel-cell membrane-subgasket assembly, including the subgasket according to the embodiment of FIG. 2A around an outer perimeter of an electrolyte membrane coated with an electrode layer, the electrode layer being interposed between the electrolyte membrane and the subgasket.
Figure 3C:
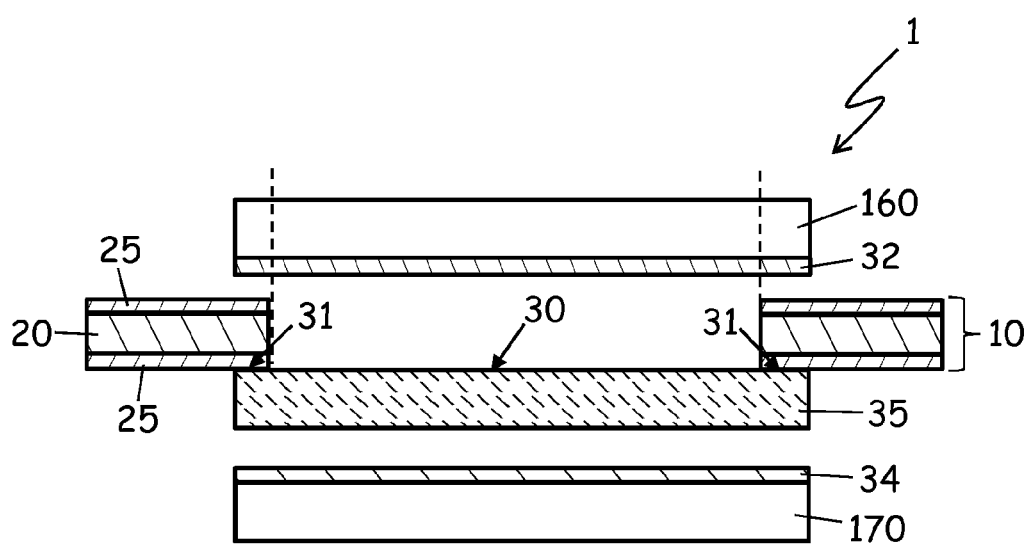
FIG. 3C is a cross-section of one embodiment of a fuel-cell membrane-subgasket assembly, including a coated subgasket around an outer perimeter of an electrolyte membrane, in which the coated subgasket and the electrolyte membrane are interposed between two catalyst-coated gas diffusion media.

Reference now will be made in detail to embodiments of fuel-cell membrane-subgasket assemblies having metalized or hard-coated subgaskets, to fuel-cell assemblies comprising the fuel-cell membrane-subgasket assemblies, and to fuel-cell stacks comprising the fuel-cell assemblies, non-limiting examples of which are illustrated in the accompanying drawings. Whenever possible, the same reference numerals will be used throughout the drawings to refer to the same or like parts. One embodiment of the fuel-cell membrane-subgasket assembly is depicted in FIG. 1, with cross sections in FIGS. 2A and 2B illustrating the coated subgasket present in the fuel-cell subgasket electrode assembly, and a further cross-section in FIG. 3 illustrating the relationship of the subgasket to other layers of the fuel-cell membrane-subgasket assembly. Further embodiments of the fuel-cell membrane-subgasket assembly are illustrated through the cross sections of FIGS. 3A, 3B, and 3C. Embodiments of fuel-cell assemblies comprising the fuel-cell membrane-subgasket assemblies will be described below with reference to FIG. 4, and embodiments of fuel-cell stacks comprising the fuel-cell assemblies will be described below with reference to FIG. 5.

Referring to FIGS. 1 and 3A, a fuel-cell membrane-subgasket assembly 1 according to some embodiments may comprise an electrolyte membrane 35 and a coated subgasket 10 overlying the electrolyte membrane 35 around a perimeter 31 of the electrolyte membrane 35. As used herein, the term "overlying" with respect to the coated subgasket 10 refers to only the location of the coated subgasket 10 relative to the electrolyte membrane 35 and does not preclude the presence of additional features between the coated subgasket 10 and the electrolyte membrane 35. Moreover, it should be understood that the term "overlying" is not intended to imply any preferred orientation of the fuel-cell membrane-subgasket assembly 1, such that in operation the coated subgasket could be above the electrolyte membrane 35 in some embodiments, below the electrolyte membrane 35 in other embodiments, or beside the electrolyte membrane 35 in still other embodiments. The coated subgasket 10 may define an active area 30 inside the perimeter 31 of the electrolyte membrane 35.

FIGS. 3A, 3B, and 3C illustrate three exemplary embodiments of fuel-cell membrane-subgasket assemblies 1. It should be understood that FIGS. 3A, 3B, and 3C are partially exploded views and that the individual components shown in the figures may be physically touching in an operational fuel cell and may optionally be held together by intermediate layers (not shown) such as adhesives. In embodiments according to FIG. 3A, the coated subgasket of the fuel-cell membrane-subgasket assembly 1 may lie directly on the electrolyte membrane 35. In embodiments according to FIG. 3B, the fuel-cell membrane-subgasket assembly 1 may further comprise a first electrode layer 32 and a second electrode layer 34. The first electrode layer 32 may be a catalytic coating on a first side of the electrolyte membrane 35, and the second electrode layer may be a catalytic coating on a second side of the electrolyte membrane 35 opposite the first side. In some embodiments according to FIG. 3B, the first electrode layer 32 may be the anode electrode, and the second electrode layer 34 may be the cathode electrode. In other embodiments according to FIG. 3B, the first electrode layer 32 may be the cathode electrode and the second electrode layer 34 may be the anode electrode.

In embodiments according to FIG. 3C, the fuel-cell membrane-subgasket assembly 1 may further comprise a first gas diffusion medium 160, a second gas diffusion medium 170, a first electrode layer 32, and a second electrode layer 34. The first electrode layer 32 is a catalytic coating on the first gas diffusion medium 160. The second electrode layer 34 is a catalytic coating on the second gas diffusion medium 170. The coated subgasket 10 is interposed between the first electrode layer 32 and the electrolytic membrane 35. In some embodiments according to FIG. 3C, the first electrode layer 32 may be the anode electrode, and the second electrode layer 34 may be the cathode electrode. In other embodiments according to FIG. 3C, the first electrode layer 32 may be the cathode electrode and the second electrode layer 34 may be the anode electrode.

Referring to FIG. 1, in the embodiments according to any of FIGS. 3A, 3B, and 3C, the coated subgasket 10 may have defined therein a plurality of individual channels or headers for accommodating the flow of gases or fluids such as, for example, fuel, oxidant, or coolant. For example, the coated subgasket 10 may have defined therein a first subgasket fuel channel 50, a second subgasket fuel channel 55, a first subgasket oxidant channel 60, a second subgasket oxidant channel 65, a first subgasket coolant channel 70, and a second subgasket coolant channel 75. In a fuel-cell assembly or fuel-cell stack including a fuel-cell membrane-subgasket assembly 1, for example, each of the individual channels or headers may be in fluidic communication with corresponding channels or headers on other plates of the fuel-cell assembly or fuel-cell stack.

Figure 2C:
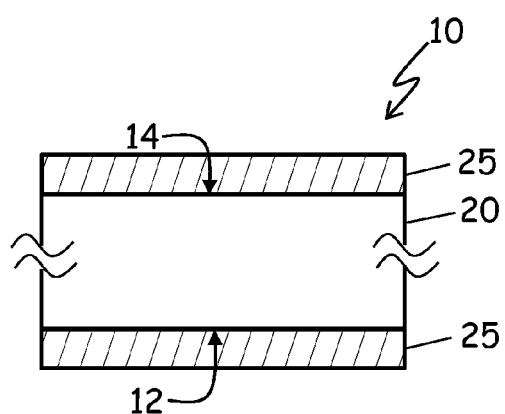
FIG. 2C is a cross-section of the fuel-cell membrane-subgasket assembly of FIG. 1, showing a subgasket according to another embodiment disclosed herein, where the coated subgasket is coated on both the first face and the second face.

Referring to the cross section of FIG. 1 shown in FIGS. 2A-2C, the coated subgasket 10 comprises a subgasket body 20 formed from a subgasket material. The subgasket body 20 has a first subgasket side 12 facing the electrolyte membrane 35 and a second subgasket side 14 opposite the first subgasket side 12. At least one of the first subgasket side 12 of the subgasket body 20 and the second subgasket side 14 of the subgasket body 20 comprises a subgasket coating layer 25 over the subgasket material. Non-limiting embodiments of the coating of various sides of the subgasket body 20 are shown in FIGS. 2A-2C. For example, as in the embodiment of FIG. 2A, only the second subgasket side 14 of the subgasket body 20 may be coated with a subgasket coating layer 25. Alternatively, as in the embodiment of FIG. 2B, only the first subgasket side 12 of the subgasket body 20 may be coated with a subgasket coating layer 25. In a further embodiment shown in FIG. 2C, both the first subgasket side 12 of the subgasket body 20 and the second subgasket side 14 of the subgasket body 20 may be coated with a subgasket coating layer 25.

Though in FIGS. 3A and 3B the fuel-cell membrane-subgasket assembly 1 includes the coated subgasket 10 according to the embodiment of FIG. 2A, it should be understood that the coated subgasket 10 according to either embodiment of FIG. 2B or 2C may be incorporated into the fuel-cell membrane-subgasket assembly 1 instead. Likewise, though in FIG. 3C the fuel-cell membrane-subgasket assembly 1 includes the coated subgasket 10 according to the embodiment of FIG. 2C, it should be understood that the coated subgasket 10 according to either embodiment of FIG. 2A or 2B may be incorporated into the fuel-cell membrane-subgasket assembly 1 instead. The subgasket material of the subgasket body 20 and the materials and properties of the subgasket coating layer 25 will be discussed in greater detail below.

The subgasket body 20 of the coated subgasket 10 may be formed from any suitable subgasket material known in the art. In non-limiting embodiments, the subgasket body 20 may be formed from polymeric materials such as polyolefins (e.g., polyethylene, polypropylene, mixtures thereof, and derivatives thereof), polyethylene naphthalate (PEN), or Mylar, for example. In preferred embodiments, the subgasket body 20 may be made from poly(ethylene terephthalate) (PET). Without intent to be bound by theory, it is believed that PET is generally unsuitable for use as a subgasket material in fuel-cell applications because over time it tends to degrade or become brittle, particularly in the presence of the water that is generated during operation of a fuel cell. However, the inventors have found surprisingly that when one or both sides of a subgasket body 20 is coated with a subgasket coating layer 25 according to embodiments described herein, not only are mechanical properties of the PET improved, but the PET is protected from water intrusion and is less likely to suffer from degradation issues. Moreover, PET may be a preferred material for the subgasket body 20 because it is comparatively less expensive than the most commonly used subgasket materials, PEN in particular. In illustrative embodiments, the subgasket body may have a thickness of from about 12 µm to about 125 µm or, preferably, from about 25 µm to about 75 µm.

In some embodiments, the subgasket coating layer 25 may be any coating material that is chemically compatible with the subgasket material and, preferably, also chemically compatible at operating temperatures and pressures with fuel-cell reactants such as hydrogen, with oxidants such as oxygen, and with byproducts or coolant media such as water and ethylene glycol. Preferably, the material of the subgasket coating layer 25, the thickness of the coating material, or both, are chosen so that physical characteristics of the subgasket body 20 are substantially changed in a manner useful to limiting degradation and/or deformation of the coated subgasket during prolonged operation of a fuel cell assembly or a fuel cell stack that includes the fuel-cell membrane-subgasket assembly 1. In illustrative embodiments, the subgasket coating layer 25 may comprise, consist essentially of, or consist of coating materials such as metals; steels; alloys; ceramics such as oxides, nitrides, and carbides; acrylic coatings; polymeric materials; polymer composite materials; and hard coatings such as diamond-like carbon, for example. In some preferred embodiments, titanium nitride (TiN), chromium, stainless steel may be well-suited as the subgasket coating layer 25. The subgasket coating layer 25 may be applied to the first subgasket surface 12, the second subgasket surface 14, or both, by any suitable and practical coating method such as, for example, vacuum deposition, plasma assisted deposition, microwave assisted chemical vapor deposition, metalization, electrodeposition, RF or magnetron sputtering, chemical vapor deposition, physical vapor deposition, or evaporation.

The thickness of the subgasket coating layer 25 may vary, depending on the thickness of the subgasket body 20 and the materials chosen for the subgasket body 20 and the subgasket coating layer 25. In non-limiting illustrative embodiments, the subgasket coating layer may have a thickness of from about 0.01 µm to about 20 µm, preferably from about 0.1 µm to about 10 µm. In some embodiments, the ratio of the thickness of the subgasket coating layer to the thickness of the subgasket body may be from about 1:2 to about 1:500, of from about 1:10 to about 1:500, or from about 1:50 to about 1:500, or from about 1:100 to about 1:500, or preferably from about 1:250 to about 1:500. In some embodiments, the subgasket body 20 may have a thickness of from about 0.2 µm to about 1000 µm, or from about 1.0 µm to about 500 µm, or from about 5 µm to about 200 µm, or from about 10 µm to about 200 µm, or from about 10 µm to about 100 µm. In an illustrative, non-limiting embodiment, the subgasket body 20 may be formed of PET having a thickness of from about 10 µm to about 100 µm, and the subgasket coating layer 25 may have a thickness of from about 0.1 µm to about 1.0 µm and may comprise chromium, stainless steel, or titanium nitride.

Preferably, the subgasket coating layer 25, regardless of thickness, has a substantially uniform thickness, is substantially free of cracks, or both. As used herein, the phrase "substantially uniform thickness" means that the subgasket coating layer 25 varies by not more than from about ±25%, preferably from about ±10% from its thickest point to its thinnest point, as measured perpendicular from the surface of the subgasket body 20. As used herein, the phrase "substantially free of cracks" means that the subgasket coating layer 25 is devoid of an pinholes having a diameter of greater than 50 nm and is also devoid of cracks having a width of greater than 50 nm measured parallel to the surface of the subgasket body 20. It may be particularly preferred that the subgasket coating layer 25 may be devoid of any thickness variation or surface defect that enables electrical continuity to be established from the exposed surface of the subgasket coating layer 25 to the first subgasket side 12, the second subgasket side 14, or both. Without intent to be bound by theory, it is believed that the occurrence or prevalence of cracks or defects in the subgasket coating layer 25 may reduce or negate some of the benefits such as increased bending stiffness and/or increased puncture resistance associated with adding the subgasket coating layer 25 to the subgasket body 20.

Without intent to be bound by theory, it is believed that the subgasket coating layer 25 may be beneficial to the subgasket body 20 by increasing both the rigidity of the coated subgasket 10 and the puncture resistance of the coated subgasket 10. In some embodiments, for example, the subgasket coating layer 25 may increase the bending stiffness of the subgasket body by at least 50%, at least 100%, at least 200%, at least 300%, or even at least 500%. These physical characteristics may be of importance when the coated subgasket is incorporated into a fuel-cell assembly or a fuel-cell stack, including those to be described below. In particular, it is believed that a coated subgasket 10 having increased rigidity may be less likely to bend when a pressure differential is present on opposite sides of the coated subgasket 10 during operation of a fuel cell. Generally, a subgasket less prone to bending deformations may also be less likely to intrude into the fuel or oxidant conduits of the bipolar plate in the fuel-cell stack. Such contacts and/or intrusions may decrease the available fuel and/or oxidant supply to the active area 30. These deleterious effects can result in reduced power output from the fuel-cell stack. With regard to puncture resistance, it is believed that increased puncture resistance of the coated subgasket 10 may be desirable because layers such as bipolar plates that are near or adjacent to the coated subgasket 10 in typical fuel-cell stacks naturally may have uneven surfaces or defects that can pierce through the subgasket body 20. Once the subgasket body 20 is pierced in this manner, leakage of fuel, oxidant, or water may occur, potentially decreasing active area or even rendering a particular membrane electrode assembly in a fuel-cell stack inoperative.

During operation of a fuel cell including the fuel-cell membrane-subgasket assembly 1, a fuel such as hydrogen, for example, may flow through the first subgasket fuel channel 50 in one direction perpendicular to the plane of the coated subgasket 10 and through the second subgasket fuel channel 55 in the opposite direction. An oxidant such as oxygen, for example, may flow through the first subgasket oxidant channel 60 in one direction perpendicular to the plane of the coated subgasket 10 and through the second subgasket oxidant channel 65 in the opposite direction. Likewise, a coolant such as water, for example, may flow through the first subgasket coolant channel 70 in one direction perpendicular to the plane of the coated subgasket 10 and through the second subgasket coolant channel 75 in the opposite direction. Depending on the operational requirements of such a fuel cell, it should be understood that the flow directions of the fuel, the oxidant, and the coolant on one side of the coated subgasket 10 (e.g., through the second subgasket fuel channel 55, the first subgasket oxidant channel 60, and the first subgasket coolant channel 70), may all be the same, or that any two of the fuel, the oxidant, and the coolant may have a counterflow relationship to the remaining one of the fuel, the oxidant, and the coolant on the same sides of the coated subgasket 10.

Embodiments of a fuel-cell assembly 100 now will be described with reference to FIG. 4, with occasional reference to FIGS. 1, 2A-2C, and 3A-3C to describe components of the fuel-cell membrane-subgasket assembly 1. The fuel-cell assembly 100 comprises a first gas diffusion medium 160, a second gas diffusion medium 170, and a fuel-cell membrane-subgasket assembly 1 according to any of the embodiments described above. In particular (see FIGS. 1 and 3A), the fuel-cell membrane-subgasket assembly 1 may comprise an electrolyte membrane 35 and a coated subgasket 10 overlying a perimeter 31 of the electrolyte membrane 35. The coated subgasket 10 defines an active area 30 inside the perimeter 31 of the electrolyte membrane 35. The coated subgasket 10 comprises a subgasket body 20 formed from a subgasket material. The subgasket body 20 has a first subgasket side 12 and a second subgasket side 14 opposite the first subgasket side 12. At least one of the first subgasket side 12 of the subgasket body 20 and the second subgasket side 14 of the subgasket body 20 comprises a subgasket coating layer 25 over the subgasket material. The subgasket material and the subgasket coating layer 25 are as described above with respect to the embodiments of the fuel-cell membrane-subgasket assembly 1.

In the fuel-cell assembly 100, the fuel-cell membrane-subgasket assembly 1 may be interposed between the first gas diffusion medium 160 and the second gas diffusion medium 170. In some embodiments, the gas diffusion media 160, 170 may optionally include a microporous layer (not shown) on a surface thereof facing the electrolyte membrane.

In some embodiments, the fuel-cell membrane-subgasket assembly 1 of the fuel-cell assembly 100 may be configured according to either of the embodiments of FIG. 3B, or 3C. The configuration of the fuel-cell membrane-subgasket assembly 1 determines the location of electrode layers in the fuel-cell assembly 100. In either configuration, the fuel-cell assembly 100 comprises a first electrode layer 32 (not shown in FIG. 4) interposed between the electrolyte membrane 35 of the fuel-cell membrane-subgasket assembly 1 and the first gas diffusion medium 160. The fuel-cell assembly 100 further comprises a second electrode layer 34 (not shown in FIG. 4) interposed between the electrolyte membrane 35 of the fuel-cell membrane-subgasket assembly 1 and the second gas diffusion medium 170.

In some embodiments, the fuel-cell membrane-subgasket assembly 1 of the fuel-cell assembly 100 may be configured according to FIG. 3B. In such embodiments, the first electrode layer 32 and the second electrode layer 34 are catalytic coatings on the electrolyte membrane 35 and the first gas diffusion medium 160 and the second gas diffusion medium 170 are outside the fuel-cell membrane-subgasket assembly 1. In other embodiments, the fuel-cell membrane-subgasket assembly 1 of the fuel-cell assembly 100 may be configured according to FIG. 3C. In such embodiments, the first electrode layer 32 is a catalytic coating on the first gas diffusion medium 160, and the second electrode layer 34 is a catalytic coating on the second gas diffusion medium 170. Regardless of where the electrode layers are located, however, the combination of the fuel-cell membrane-subgasket assembly 1, the first gas diffusion medium 160, and the second gas diffusion medium 170 may form a unitized electrode assembly 150. The components of the unitized electrode assembly 150 may be assembled during production thereof and affixed to one another by any conventional process such as hot pressing, for example. An adhesive may be used between individual components where necessary.

The fuel-cell assembly 100 further comprises a bipolar plate 110 having a cathode side 120 and an anode side 130 opposite the cathode side 120. The bipolar plate is arranged such that the first gas diffusion medium 160 is interposed between the bipolar plate 110 and the active area 30 of the fuel-cell membrane-subgasket assembly 1. It should be understood that the orientation of the cathode side 120 and the anode side 130 of the bipolar plate 110 with respect to the fuel-cell membrane-subgasket assembly 1 as shown in FIG. 4 has been chosen for the sake of illustration only and that, depending on the actual orientation of the electrodes in the fuel-cell membrane-subgasket assembly 1 (see FIG. 3), the cathode side 120 and the anode side 130 of the bipolar plate 110 may be reversed from their orientation in FIG. 4. This will become more apparent in the description of fuel cell stacks below.

The bipolar plate 110 is typically formed by a conventional process for shaping sheet metal such as stamping, machining, molding, or photo-etching through a photolithographic mask, for example. In one embodiment, the bipolar plate 110 may be formed from unipolar endplates which are then joined. It should be understood that the bipolar plate 110 may also be formed from a composite material. In one particular embodiment, the bipolar plate 110 may be formed from a graphite or graphite-filled polymer.

Figure 4:
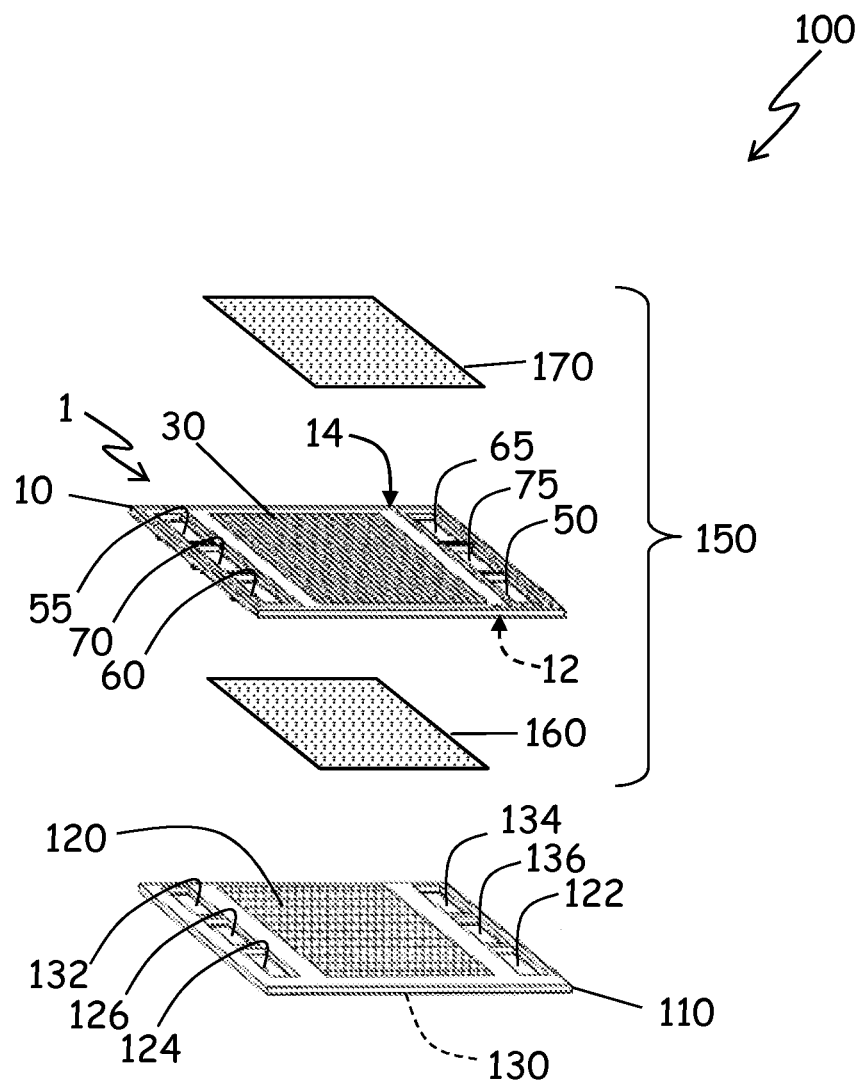
FIG. 4 is a fuel-cell assembly according to embodiments described herein, which includes a fuel-cell membrane-subgasket assembly according to embodiments herein.

As shown in the non-limiting embodiment of FIG. 4, the bipolar plate 110 further may comprise a plurality of individual channels or headers that place the bipolar plate 110 in fluidic communication with the electrolyte membrane (see FIG. 3), particularly the active area 30 of the fuel-cell membrane-subgasket assembly 1. The fluidic communication may be established, for example, because the individual channels of the bipolar plate 110 align with the individual channels of the coated subgasket 10 to form fluidic conduits. For example, the bipolar plate 110 may comprise a first plate fuel channel 122 that aligns with the first subgasket fuel channel 50, a second plate fuel channel 132 that aligns with the second subgasket fuel channel 55, a first plate oxidant channel 124 that aligns with the first subgasket oxidant channel 60, a second plate oxidant channel 134 that aligns with the second subgasket oxidant channel 65, a first plate coolant channel 126 that aligns with the first subgasket coolant channel 70, and a second plate coolant channel 136 that aligns with second subgasket coolant channel 75.

Figure 5:
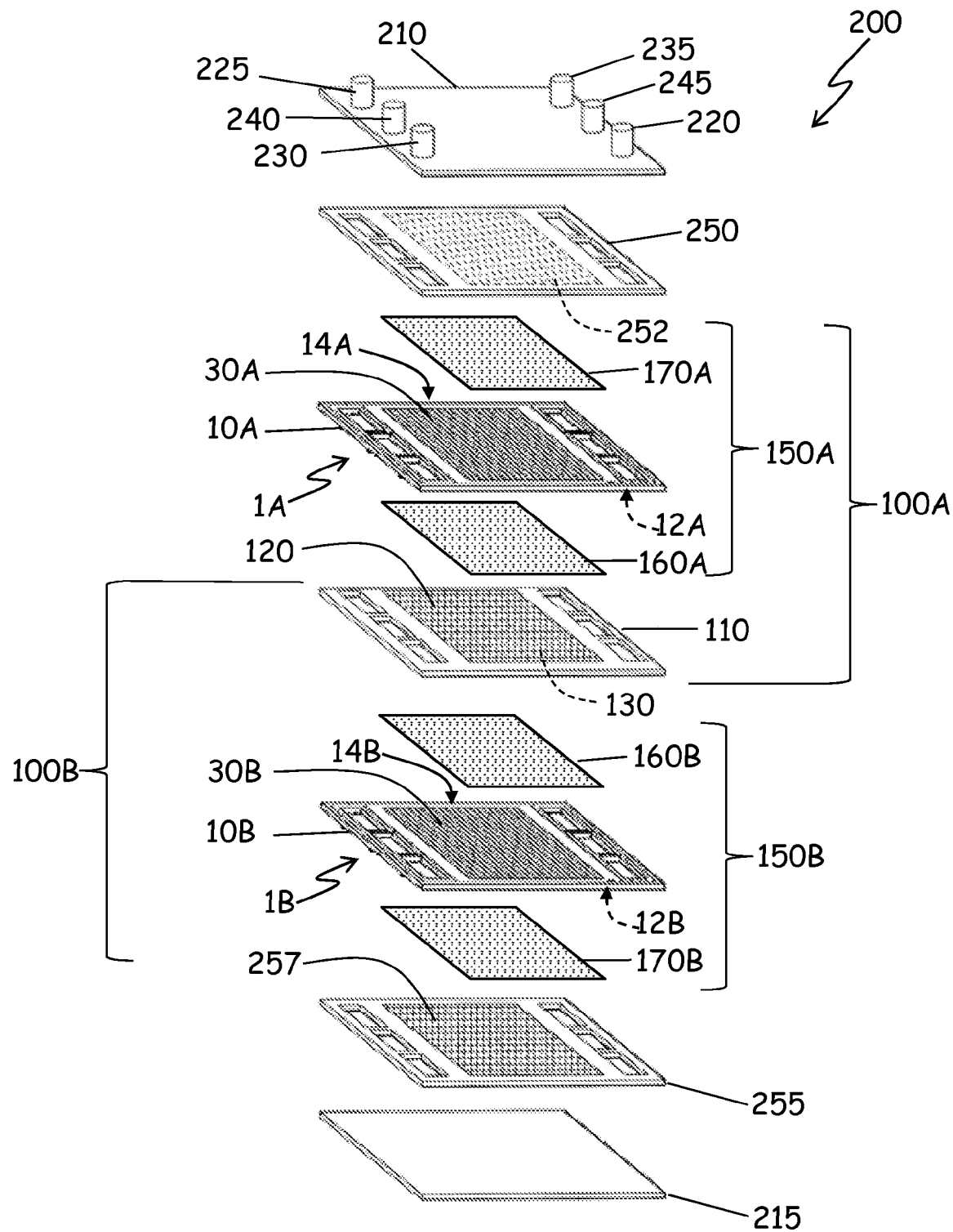
FIG. 5 is a fuel-cell stack according to embodiments described herein, which includes a stacked configuration containing two of the fuel-cell assemblies of FIG. 4.

With reference now to FIG. 5, embodiments of a fuel cell stack 200 will be described. For simplicity, only a two-cell stack (i.e., a stack having only one bipolar plate (i.e., bipolar plate 110)) is illustrated and described hereafter, it being understood that a typical fuel-cell stack may contain a much higher number of such cells and bipolar plates, for example tens, hundreds, or even thousands.

According to some embodiments, the fuel-cell stack 200 may comprise a first clamping plate 210, a second clamping plate 215, a first unipolar endplate 250 disposed between the first clamping plate 210 and the second clamping plate 215, and a second unipolar endplate 255 disposed between the first unipolar endplate 250 and the second clamping plate 215. Optionally, the clamping plates 210, 215 may be electrically insulated from the unipolar endplates 250, 255 by a gasket (not shown) or a dielectric coating (not shown).

The first clamping plate 210 may comprise various connections 220, 225, 230, 235, 240, 245 that place the fuel-cell stack 200 in fluidic communication with one or more of a fuel source, an oxidant source, a coolant source, a fuel exhaust, an oxidant exhaust, and a coolant exhaust. For example, the first clamping plate may comprise a fuel supply connection 230 to a fuel source (not shown), a fuel exhaust connection 235 to a fuel exhaust manifold (not shown), an oxidant supply connection 220 to an oxidant source (not shown), an oxidant exhaust connection 225 to an oxidant exhaust manifold (not shown), a coolant inlet 240, and a coolant outlet 245. In some embodiments, the coolant inlet 240 and the coolant outlet 245 may be connected as a coolant loop (not shown) or may be separately connected to respective coolant sources (not shown) or exhausts (not shown). Each of the various connections 220, 225, 230, 235, 240, 245 is configured to align with conduits defined by channels in the plates 250, 10A, 110, 10B, 255 of the fuel-cell stack 200. The various connections may be configured such that all of the fuel, oxidant, and coolant flow through the fuel-cell stack 200 in the same direction or such that any two of the fuel, oxidant, and coolant flow in a direction opposite the third of the fuel, oxidant, and coolant. As such, it should be understood that the choice of names for the individual connections 220, 225, 230, 235, 240, 245 in FIG. 5 is made for illustrative purposes only.

The fuel-cell stack 200 may further comprise a plurality of individual fuel-cell assemblies 100A, 100B, of which only two are shown in FIG. 5, though typical fuel-cell stacks may contain 10, 50, or even several hundred individual fuel-cell assemblies. Each individual fuel-cell assembly 100A, 100B is positioned between the first unipolar endplate 250 and the second unipolar endplate 255. The unipolar endplates 250, 255 include respective active areas 252, 257. Likewise, portions of the bipolar plate 110 adjacent first gas diffusion media 160A, 160B also define active areas. Each of the active areas are typically flow fields for distributing gaseous reactants such as hydrogen gas and air over the electrode layers (see FIG. 3) of the fuel-cell membrane-subgasket assemblies 1A, 1B in the individual fuel-cell assemblies 100A, 100B.

At least one of the individual fuel-cell assemblies 100A, 100B is a fuel-cell assembly 100 according to at least one of the embodiments described above with reference to FIG. 4. In some embodiments, all of the individual fuel-cell assemblies 100A, 100B in the fuel-cell stack 200 are a fuel-cell assemblies according to at least one of the embodiments described above with reference to FIG. 4. The at least one of the fuel-cell assemblies 100A, 100B comprises a fuel-cell membrane-subgasket assembly 1A, 1B that includes a coated subgasket 10A, 10B, wherein the coated subgasket 10A, 10B is coated on at least one subgasket side 12A, 14A, 12B, 14B with a subgasket coating layer 25 (see FIGS. 2A-2C and further description above). Each fuel-cell membrane-subgasket assembly 1A, 1B is interposed between a respective first gas diffusion medium 160A, 160B and a respective second gas diffusion medium 170A, 170B, whereby the combinations of the fuel-cell membrane-subgasket assemblies 1A, 1B and the respective gas diffusion media 160A, 160B, 170A, 170B form unitized electrode assemblies 150A, 150B. The coated subgaskets 10A, 10B may provide a seal and electrical insulation between the unitized electrode assemblies 150A, 150B and one of the bipolar plate 110 and the end plates 250, 255. The coated subgaskets 10A, 10B may substantially follow a periphery of the unitized electrode assemblies 150A, 150B. With regard to positioning of electrode layers (not shown in FIG. 5), the fuel-cell membrane-subgasket assemblies 1A, 1B may be configured according to any of the embodiments described above, particularly those described with reference to FIGS. 3B and 3C.

The at least one of the fuel-cell assemblies 100A, 100B further comprises a bipolar plate 110 having a cathode side 120 facing one of the first clamping plate 210 and the second clamping plate 215 and an anode side 130 facing the other of the first clamping plate 210 and the second clamping plate 215. It should be understood that though the bipolar plate 110 of FIG. 5 is oriented such that the cathode side 120 faces the first clamping plate 210 and the anode side 130 faces the second clamping plate 215, this orientation is for illustrative purposes only and the cathode side 120 and the anode side 130 may be reversed. Even so, it should be further understood that when multiple bipolar plates are present in a fuel-cell stack containing more fuel-cell assemblies than shown in FIG. 5, all cathode sides of the bipolar plates will face the same direction (i.e., toward either the first clamping plate 210 or the second clamping plate 215). The bipolar plate 110 of each individual fuel-cell assembly 100A, 100B is in fluidic communication with the fuel-cell membrane-subgasket assembly 1A, 1B of its respective individual fuel-cell assembly 100A, 100B, as described above with reference to FIG. 4.

In the fuel-cell stack 200, each adjacent first individual fuel cell assembly 100A and second individual fuel cell assembly 100B shares a common bipolar plate 110, such that the cathode side 120 of the common bipolar plate 110 face the first individual fuel cell assembly 100A, and the anode side 130 of the common bipolar plate 110 faces the second individual fuel cell assembly 100B. Thus, according to the naming convention depicted in FIG. 5 with respect to the individual fuel cell assemblies 100A, 100B, the first subgasket side 12A of the first individual fuel-cell assembly 100A is the anode side of the first individual fuel-cell assembly 100A and the second subgasket side 12A of the first individual fuel-cell assembly 100A is the cathode side of the first individual fuel-cell assembly 100A. The relationship is reversed for the second individual fuel-cell assembly 100B, whereby the first subgasket side 12B of the second individual fuel-cell assembly 100B is the cathode side of the second individual fuel-cell assembly 100B and the second subgasket side 14B of the second individual fuel-cell assembly 100B is the anode side of the first individual fuel-cell assembly 100B. It should be understood that the naming convention is illustrative only and could be reversed in the fuel-cell stack 200 as a whole, such that all cathode sides become anode sides and all anode sides become cathode sides.

It should be understood that the fuel-cell stack 200 of FIG. 5 is intended as non-limiting with regard to any additional components or features that may be incorporated. The fuel-cell stack may also contain additional components not shown in FIG. 5 such as, for example, insulator plates or the non-conductive gaskets described in commonly-assigned U.S. Pat. Appl. Pub. No. 2010/0159294, which is incorporated herein by reference in its entirety. The fuel-cell stack 200 may be used as a sole or supplemental power source to a vehicle such as an automobile, for example.

Thus, according to various embodiments, fuel-cell membrane-subgasket assemblies 1, fuel-cell assemblies 100 comprising the fuel-cell membrane-subgasket assemblies 1, and fuel-cell stacks 200 containing at least one of the fuel-cell assemblies 100, have been described. In the fuel-cell membrane-subgasket assemblies 1 and the fuel-cell assemblies 100, and in at least one of the fuel-cell membrane-subgasket assemblies 1 contained within the fuel-cell stacks 200, a coated subgasket 10, 10A, 10B is present. In the coated subgaskets 10, 10A, 10B, a subgasket coating layer 25 over a subgasket body 20 has been shown to increase resistance to degradation and deformation of the coated subgasket 10, 10A, 10B, thereby avoiding negative effects of such degradation or deformation on the operation of electrical output of fuel cells incorporating the coated subgaskets, while not sacrificing manufacturing costs or production output.

EXAMPLES

The following Examples are offered by way of illustration only. One skilled in the art should recognize that the specific Examples are not intended to limit the scope of the embodiments described above or the claims appended to the present description.

Coated subgaskets according to embodiments described above were prepared and tested to determine suitability of the coated subgaskets for fuel-cell applications. The coated subgaskets were made by preparing a subgasket body from a subgasket material, then coating one side or both sides of the subgasket body with a subgasket coating material. To assess the improvements afforded through coating the subgasket bodies, physical characteristics of the coated subgaskets were compared with those of uncoated subgaskets. In particular, the coated and uncoated subgaskets were evaluated with respect to bending stiffness and force needed to puncture. As figures of merit for subgasket bodies of a given thickness, increases in one or both of the bending stiffness and the force needed to puncture were regarded as indicative of a desirable improvement.

Bending stiffness data are summarized in TABLE 1. Measurements for which the condition is labeled as "dry" were taken at room temperature (25° C.±2° C.), and measurements for which the condition is labeled as "wet" were taken at 70° C. in a water bath. Bending stiffness data were obtained by performing three point bending test, per ASTM D790, wherein the subgasket films were stressed in flexural mode over two cylindrical fixtures and the resistance recorded by means of a load cell installed on a tensile testing device. The force deflection data thus obtained were used to calculate the stiffness.

TABLE 1

| Example | Subgasket Body | | Subgasket Coating | | | Bending |
| | Material | Thickness (μm) | Material | Thickness (μm) | Condition | Stiffness ($10^{-4}$ N·m) |
| --- | --- | --- | --- | --- | --- | --- |
| 1 | PEN[1] | 50 | Cr | 0.5 | Dry | 1.76 |
| (comparative) | PEN[1] | 50 | N/A | | Dry | 1.19 |
| 2 | PET[2] | 25 | SS304[3] | 0.5 | Dry | 0.71 |
| 3 | PET[2] | 25 | SS304[3] | 0.2 | Dry | 0.34 |
| 4 | PET[2] | 50 | SS304[3] | 0.2 | Dry | 2.23 |
| 5 | PET[2] | 50 | SS304[3] | 0.5 | Dry | 2.38 |
| 6 | PET[2] | 50 | Hard[4] | 5.0 | Dry | 2.14 |
| (comparative) | PET[2] | 50 | N/A | | Dry | 1.29 |
| 7 | PET[2] | 50 | SS304[3] | 0.2 | Wet | 1.92 |
| 8 | PET[2] | 50 | Hard[4] | 0.5 | Wet | 1.40 |
| (comparative) | PET[2] | 50 | N/A | | Wet | 0.59 |

[1]Polyethylene naphthlate
[2]Polyethylene terephthalate
[3]Stainless Steel 304, a chromium-nickel austenitic iron alloy containing at least 18% by weight chromium, 8% by weight nickel, and a maximum of 0.8% by weight carbon
[4]An acrylic polymer with oxide fillers As seen from TABLE 1, polyester films with coatings such as chromium or SS304 SS304) provide much higher bending stiffness than the uncoated film at the same thickness, both under dry and wet conditions.

The puncture resistance test method, per ASTM F1306, permits subgasket films to be characterized for slow rate penetration resistance to a driven probe. The sample is held by a set of clamping rings and is subjected to biaxial stresses which are representative of the stresses encountered when in the fuel cell stack. Data generated from this test method for various coated films are summarized in TABLE 2.

TABLE 2

| | Subgasket Body | | Subgasket Coating | | |
| Example | Material | Thickness (μm) | Material | Thickness (μm) | Force to Puncture (N) |
| --- | --- | --- | --- | --- | --- |
| 1 | PET | 25 | TiN | 0.5 | 49.3 |
| 2 | PET | 50 | TiN | 0.5 | 115 |
| 3 | PET | 50 | Cr | 0.5 | 117 |
| (comparative) | PET | 50 | None | | 98.3 |
| (comparative) | PET | 25 | None | | 43.7 |
| (comparative) | PEN | 50 | None | | 71.6 |
| (comparative) | PEN | 25 | None | | 35.2 |

As seen from the table above, coated films provide much higher resistance to puncture than uncoated films of the same thickness.

Unless otherwise defined, all technical and scientific terms used herein have the same meaning as commonly understood by one of ordinary skill in the art. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments described herein. Notwithstanding that the numerical ranges and parameters setting forth the broad scope of the embodiments are approximations, the numerical values set forth in the specific examples are reported as precisely as possible. One of ordinary skill in the art will understand that any numerical values inherently contain certain errors attributable to the measurement techniques used to ascertain the values.

It is noted that terms like "preferably," "commonly," and "typically" are not utilized herein to limit the scope of the appended claims or to imply that certain features are critical, essential, or even important to the structure or function of the claimed apparatus. Rather, these terms are merely intended to highlight alternative or additional features that may or may not be utilized in a particular embodiment.

For the purposes of describing and defining embodiments herein it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

Though the foregoing description includes reference to specific embodiments, it will be apparent that modifications and variations are possible without departing from the scope of that which is defined in the appended claims. More specifically, although some aspects of certain embodiments identified herein as preferred or particularly advantageous, it is contemplated that the appended claims are not necessarily limited to these preferred aspects.

What is claimed is:

1. A fuel-cell membrane-subgasket assembly comprising:
an electrolyte membrane; and
a coated subgasket overlying a perimeter of the electrolyte membrane, the coated subgasket defining an active area of the electrolyte membrane inside the perimeter of the electrolyte membrane,
wherein:
the coated subgasket comprises a subgasket body formed from polyethylene terephthalate;
the subgasket body has a first subgasket side facing the electrolyte membrane and a second subgasket side opposite the first subgasket side;
at least one of the first subgasket side of the subgasket body and the second subgasket side of the subgasket body comprises a subgasket coating layer over the subgasket material;
the subgasket coating layer comprises a subgasket coating material that increases bending stiffness of the subgasket body, degradation resistance of the subgasket body in the presence of moisture, and puncture resistance of the subgasket body; and
the subgasket coating material is titanium nitride.

2. The fuel-cell membrane-subgasket assembly of claim 1, wherein:
the subgasket coating layer has a thickness of from about 0.01 μm to about 20 μm;
the subgasket body has a thickness of from about 5 μm to about 200 μm; and
the ratio of the thickness of the subgasket coating layer to the thickness of the subgasket body is from about 1:2 to about 1:500.

3. The fuel-cell membrane-subgasket assembly of claim 1, further comprising a first electrode layer and a second electrode layer, wherein:
the electrolyte membrane is coated with the first electrode layer on a first side of the electrolyte membrane and with the second electrode layer on a second side of the electrolyte membrane opposite the first side; and
the first electrode layer is interposed between the electrolyte membrane and the coated subgasket.

4. The fuel-cell membrane-subgasket assembly of claim 1, further comprising a first gas diffusion medium, a second gas diffusion medium, a first electrode layer, and a second electrode layer, wherein:
the first electrode layer is a catalytic coating on the first gas diffusion medium;
the second electrode layer is a catalytic coating on the second gas diffusion medium; and
the coated subgasket is interposed between the first electrode layer and the electrolytic membrane.

5. A fuel cell assembly comprising:
a first gas diffusion medium;
a second gas diffusion medium;
a fuel-cell membrane-subgasket assembly interposed between the first gas diffusion medium and the second gas diffusion medium, the fuel-cell membrane-subgasket assembly comprising:
an electrolyte membrane; and
a coated subgasket overlying a perimeter of the electrolyte membrane, the coated subgasket defining an active area inside the perimeter of the electrolyte membrane,
wherein:
the coated subgasket comprises a subgasket body formed from polyethylene terephthalate;
the subgasket body has a first subgasket side facing the electrolyte membrane and a second subgasket side opposite the first subgasket side;
at least one of the first subgasket side of the subgasket body and the second subgasket side of the subgasket body comprises a subgasket coating layer over the subgasket material;
the subgasket coating layer comprises a subgasket coating material that increases bending stiffness of the subgasket body, degradation resistance of the subgasket body in the presence of moisture, and puncture resistance of the subgasket body; and
the subgasket coating material is titanium nitride;
a first electrode layer interposed between the electrolyte membrane and the first gas diffusion medium;
a second electrode layer interposed between the electrolyte membrane and the second gas diffusion medium; and
a bipolar plate having a cathode side and an anode side opposite the cathode side, the bipolar plate being in fluidic communication with the electrolyte membrane.

6. The fuel-cell assembly of claim 5, wherein:
the first electrode layer is a catalytic coating on a first electrode surface of the electrolyte membrane; and
the first electrode layer is interposed between the coated subgasket and the electrolyte membrane.

7. The fuel-cell assembly of claim 5, wherein:
the first electrode layer is a catalytic coating on the first gas diffusion medium; and
the coated subgasket is interposed between the first electrode layer and the electrolytic membrane.

8. A fuel cell stack comprising:
a first clamping plate;
a second clamping plate;
a first unipolar endplate positioned between the first clamping plate and the second clamping plate;
a second unipolar endplate positioned between the first unipolar endplate and the second clamping plate; and
a plurality of stacked individual fuel cell assemblies each positioned between the first unipolar endplate and the second unipolar endplate, at least one of the individual fuel cell assemblies comprising:
a first gas diffusion medium;
a second gas diffusion medium;
a fuel-cell membrane-subgasket assembly interposed between the first gas diffusion medium and the second gas diffusion medium, the fuel-cell membrane-subgasket assembly comprising:
an electrolyte membrane; and
a coated subgasket overlying a perimeter of the electrolyte membrane, the coated subgasket defining an active area inside the perimeter of the electrolyte membrane,
wherein:
the coated subgasket comprises a subgasket body formed from polyethylene terephthalate;
the subgasket body has a first subgasket side facing the electrolyte membrane and a second subgasket side opposite the first subgasket side;
at least one of the first subgasket side of the subgasket body and the second subgasket side of the subgasket body comprises a subgasket coating layer over the subgasket material;
the subgasket coating layer comprises a subgasket coating material that increases bending stiffness of the subgasket body, degradation resistance of the subgasket body in the presence of moisture, and puncture resistance of the subgasket body; and
the subgasket material is titanium nitride;
a first electrode layer interposed between the electrolyte membrane and the first gas diffusion medium;
a second electrode layer interposed between the electrolyte membrane and the second gas diffusion medium; and
a bipolar plate having a cathode side and an anode side opposite the cathode side, the bipolar plate being in fluidic communication with the electrolyte membrane,
wherein:
adjacent individual fuel cell assemblies of the plurality of stacked individual fuel cell assemblies share a common bipolar plate between a first individual fuel cell assembly and a second individual fuel cell assembly;
the cathode side of the common bipolar plate faces the first individual fuel cell assembly; and
the anode side of the common bipolar plate faces the second individual fuel cell assembly.

9. The fuel-cell stack of claim 8, wherein:
the first electrode layer of the at least one fuel-cell assembly is a catalytic coating on a first electrode surface of the electrolyte membrane; and
the first electrode layer of the at least one fuel-cell assembly is interposed between the coated subgasket and the electrolyte membrane.

10. The fuel-cell stack of claim 8, wherein:
the first electrode layer is a catalytic coating on the first gas diffusion medium; and
the coated subgasket is interposed between the first electrode layer and the electrolytic membrane.

* * * * *